US012797942B2

(12) United States Patent
Hsu et al.

(10) Patent No.: US 12,797,942 B2
(45) Date of Patent: Nov. 17, 2026

(54) ELECTRIC TOOL CAPABLE OF DETERMINING AN OPERATING STATUS THROUGH ROTATIONAL SPEED

(71) Applicant: TECHWAY INDUSTRIAL CO., LTD., Taichung City (TW)

(72) Inventors: Chih-Hua Hsu, Taichung City (TW); Chih Chin Yang, Taichung City (TW); Liang Huan Chen, Taichung City (TW)

(73) Assignee: TECHWAY INDUSTRIAL CO., LTD., Taichung City (TW)

( * ) Notice: Subject to any disclaimer, the term of this patent is extended or adjusted under 35 U.S.C. 154(b) by 211 days.

(21) Appl. No.: 18/982,493

(22) Filed: Dec. 16, 2024

(65) Prior Publication Data

US 2026/0166619 A1 Jun. 18, 2026

(51) Int. Cl.

| | |
|---|---|
| ***B25B 27/00*** | (2006.01) |
| ***B21J 15/10*** | (2006.01) |
| ***B21J 15/26*** | (2006.01) |
| ***B25C 11/00*** | (2006.01) |

(52) U.S. Cl.

CPC ............. *B21J 15/26* (2013.01); *B21J 15/105* (2013.01); *B25C 11/00* (2013.01)

(58) Field of Classification Search

CPC ... B25B 21/00; B25B 21/002; B25B 23/0057; B25B 27/00; B25B 27/02

See application file for complete search history.

(56) References Cited

U.S. PATENT DOCUMENTS

| | | | | |
|---|---|---|---|---|
| 4,085,337 | A * | 4/1978 | Moeller | B25B 27/0014 29/243.526 |
| 11,292,049 | B2 * | 4/2022 | Hsu | B21J 15/043 |
| 2022/0062972 | A1 * | 3/2022 | Hsu | B21J 15/28 |
| 2023/0268866 | A1 * | 8/2023 | Friedman | B25B 21/02 173/93.5 |
| 2023/0294162 | A1 * | 9/2023 | Yabuguchi | B21J 15/105 227/61 |
| 2024/0342786 | A1 * | 10/2024 | Hsu | B21J 15/04 |
| 2026/0166619 | A1 * | 6/2026 | Hsu | B21J 15/26 |

* cited by examiner

*Primary Examiner* — Lee D Wilson

(74) *Attorney, Agent, or Firm* — Daniel Polk; Darryl Scott

(57) ABSTRACT

An electric tool capable of determining an operating status through a rotational speed, comprising: a body; an electric motor capable of rotating by being driven through phase changes; a driving rod capable of performing an action to deform a workpiece by being driven by the electric motor; a processing unit electrically connected to the electric motor, the processing unit is capable of providing phases for driving the electric motor by being operated; a timer capable of calculating an elapsed time for driving the electric motor with a predetermined number of phases, and a memory capable of recording changes of the elapsed time of the phases; when the processing unit detects an increasing change in a time of the phases, that is, when a rotational speed of the electric motor slows down, an action change signal is generated and the action change signal is transmitted to the processing unit. Through the action change signal, and depending on whether a load is combined, processing of counting or subsequent operations can be generated.

14 Claims, 11 Drawing Sheets

ELECTRIC TOOL CAPABLE OF DETERMINING AN OPERATING STATUS THROUGH ROTATIONAL SPEED

FIELD OF THE INVENTION

The invention relates to an electric tool, and more particularly to an electric tool capable of determining a present operating status through changes in a rotational speed of an electric motor.

DESCRIPTION OF THE RELATED ART

Commonly known electric tools, such as nail machine, rivet nut machine, etc., drive an actuating rod through the rotation of an electric motor, so that the actuating rod can perform a predetermined stroke to pull nails or pull rivet nuts. When a conventional electric tool is operated, the electric motor performs a fixed and consistent cycle, and can also drive the actuating rod to operate in the same mode. Each cycle can represent the completion of an operation.

During the operation of conventional electric tools (nail machine or rivet nut machine), the user cannot confirm whether nails or rivet nuts pulling action is performed in a single operation. When the electric tool performs a operation stroke, it cannot confirm whether the electric tool has completed the action of pulling nails or rivet nuts, or whether the action of pulling nails and rivet nuts is interrupted in the middle, or whether the nails or rivet nuts are damaged and the operation is not completed. In addition, the user needs to check the number of operations after completing the nail or rivet nut-pulling operation in a working day or on a workpiece. However, conventional electric tools can only record a number of times of operations, rather than a number of times of the actual completion of nail or rivet nut-pulling operations, causing the user to be unable to confirm the number of completed nail or rivet nut-pulling operations.

SUMMARY OF THE INVENTION

One object of the invention is to provide an electric tool capable of driving an electric motor to rotate with phase changes in a fixed duty cycle, and capable of converting different rotational speed changes of the electric motor into different operating statuses, thereby determining an operating status of the electric tool.

One object of the invention is to provide an electric tool capable of using an action change signal generated when a rotational speed slows down as a purpose for counting a number of times of nail-pulling.

One object of the invention is to provide an electric tool capable of using an action change signal generated when a rotational speed slows down as a purpose for confirming a pre-lock status.

One object of the invention is to provide an electric tool capable of using an action change signal generated when a rotational speed slows down as a purpose for determining a time of stop applying force.

In order to achieve the above objects, the invention provides an electric tool capable of determining an operating status through a rotational speed, comprising:

a body;

an electric motor disposed in the body and capable of rotating by being driven through phase changes;

a driving rod disposed in the body and capable of performing an operation to deform a workpiece by being driven by the electric motor;

a processing unit disposed in the body and electrically connected to the electric motor, the processing unit is capable of providing phases for driving the electric motor by being operated;

the processing unit is provided with a timer capable of receiving phase changes of the electric motor and measuring a time of a predetermined number of phase changes of the electric motor, and a memory capable of recording and calculating a time of the phase changes;

when the processing unit detects an increasing change in a time of the phase changes, that is, when a rotational speed of the electric motor slows down, an action change signal is generated, and an operating status of the driving rod can be determined through the action change signal.

Thereby, by measuring a rotating speed of the electric motor through the timer, an operating status of the electric motor and the driving rod can be known, and corresponding operations can be performed.

Preferably, the electric tool is a nail gun, and the action change signal is that during operation, an increase in time of the phase changes of the electric motor. After a rotational speed of the electric motor slows down, a time it takes to drive the electric motor through the phase changes is reduced, and a change in a rotational speed of the electric motor becoming faster is defined as a nail-pulling operation.

Preferably, the electric tool is a rivet nut gun, and the action change signal is that during operation, a time of the phase changes that drive the electric motor is increased earlier, so that a rotational speed of the electric motor slows down earlier, and the action change signal is defined as a pre-lock operation.

Preferably, the electric tool is a rivet nut gun, and the action change signal is defined as a rivet nut-pulling operation; the action change signal of the rivet nut-pulling operation has a first action change signal and a second action change signal; the first action change signal is that a time of the phase changes that drive the electric motor is maintained after increasing, a rotational speed of the electric motor being slowed down and then maintained is defined as an operation of deformed rivet nut, the second action change signal is that a time of the phase changes that drive the electric motor continues to increase, a rotational speed of the electric motor continuing to slow down until stopping is defined as an operation of pressurized rivet nut.

The invention provides an electric tool capable of determining a load through a rotational speed, by calculating a change in a reduced rotational speed caused by requiring to increase a torque due to the load when a driving rod processes a workpiece, it can be known whether the workpiece is driven by the driving rod in order to perform counting or other operations.

BRIEF DESCRIPTION OF DRAWINGS

The objects, features, and achieved efficacies of the invention can be understood from the description and drawings of the following two preferred embodiments, in which.

DETAILED DESCRIPTION OF THE INVENTION

Please refer to FIG. 1 to FIG. 5 for a preferred embodiment of an electric tool provided by the invention. An electric tool 10 is a nail gun 11 and mainly comprises a body 20 and a processing unit 30.

Figure 1:
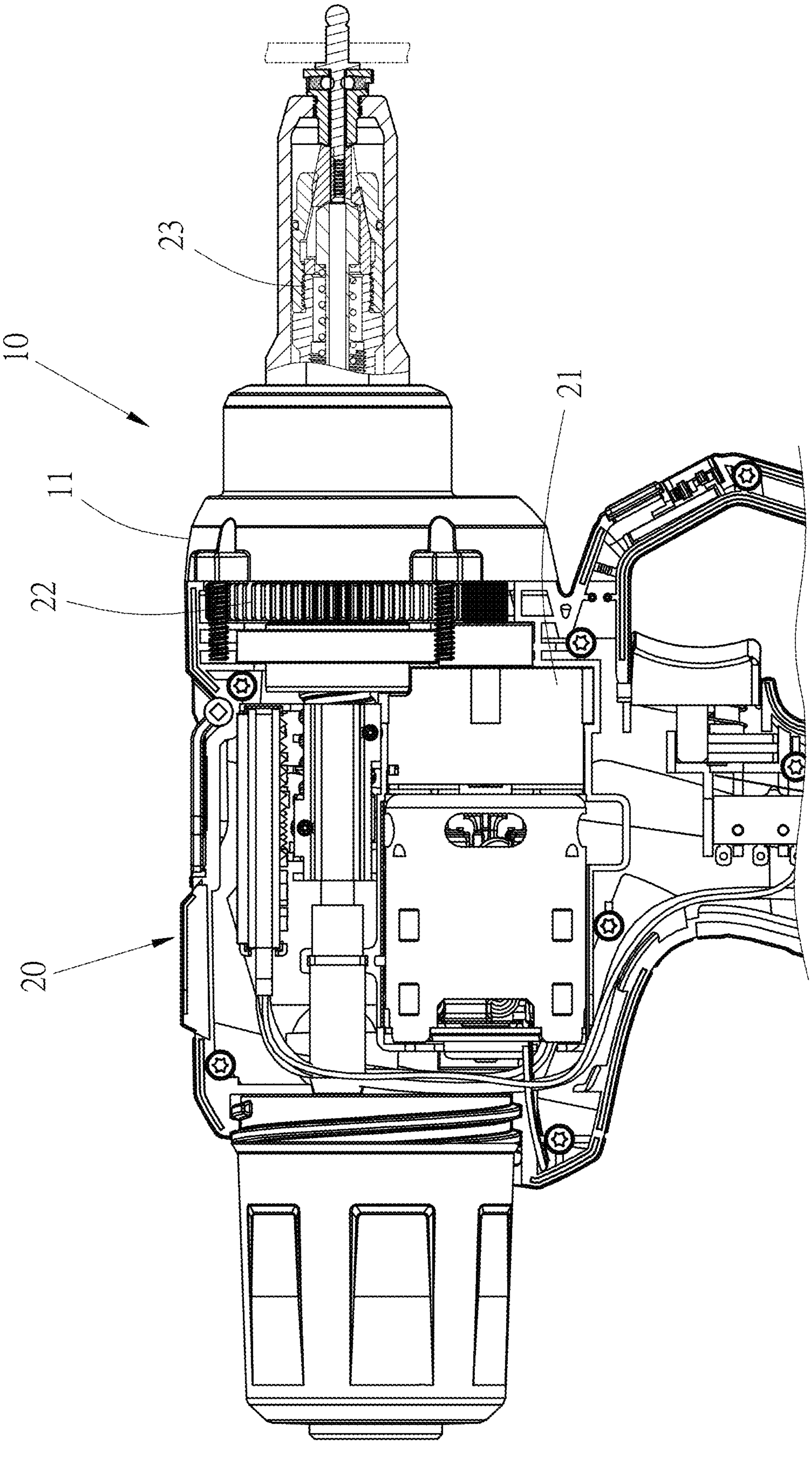
FIG. 1 is a structural diagram of a nail gun according to a first preferred embodiment of the invention.

Please refer to FIG. 1. The body 20 is provided with an electric motor 21 inside, which in this embodiment is a four-pole six-phase brushless DC electric motor. The brushless DC electric motor can provide a larger actuation torque at a lower rotational speed. A front end of the electric motor 21 is provided with a gear set 22; a driving rod 23 is driven by the gear set 22 to produce a nail-pulling operation. The electric motor 21 provides an electric power through a power source 24. A nail-pulling action performed by the driving rod 23 is a conventional action of conventional structures, which will not be described in detail here.

Figure 2:
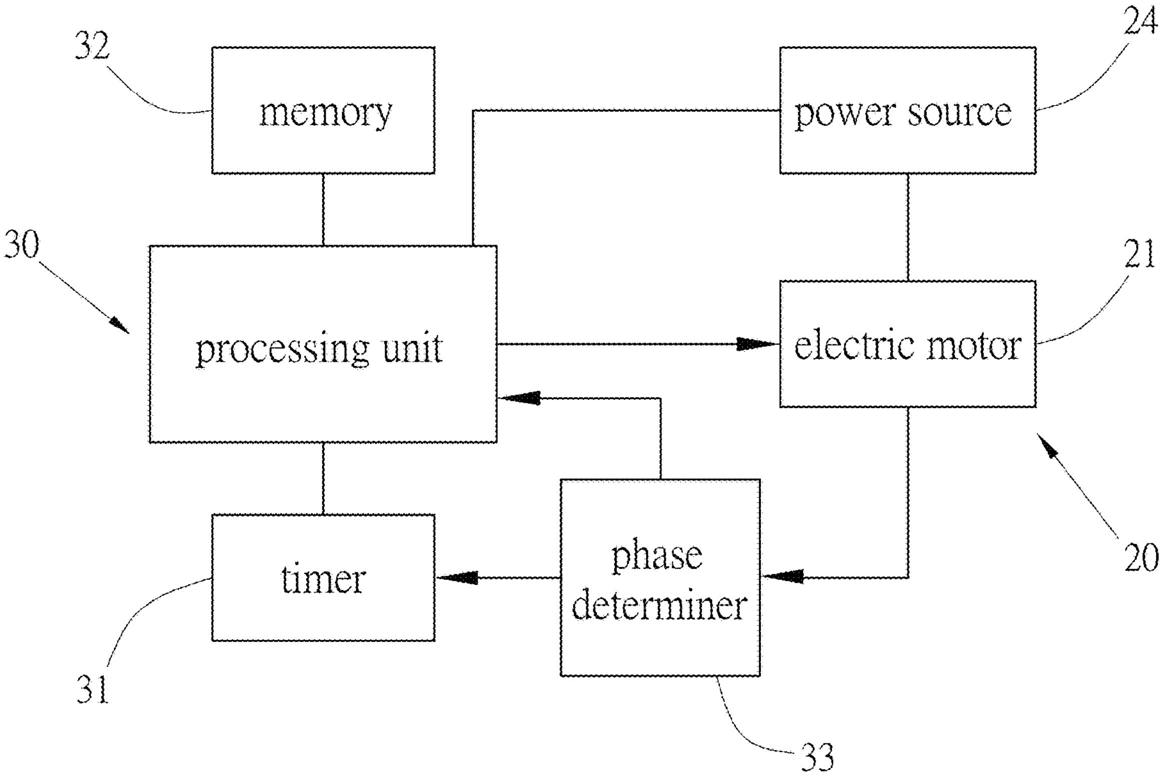
FIG. 2 is a structural block diagram of the first preferred embodiment of the invention.

Please refer to FIG. 2. The processing unit 30 is electrically connected to the electric motor 21 and the power source 24. The processing unit 30 is capable of providing sequentially changing phases to the electric motor 21, so that the electric motor 21 is capable of rotating by being driven through phase changes, a duty cycle of each phase is fixed, and phase change control of the brushless DC electric motor is used to make the electric motor 21 rotate; cyclic changes of every twelve phases can drive the electric motor 21 to rotate one revolution, that is, there are twelve phase changes when the electric motor 21 rotates one revolution. In this embodiment, a time of an angle it takes for the electric motor 21 to rotate one revolution is used as a timing cycle. In implementation, an angle of half a turn (six phases) or ¼ turn (three phases) of the electric motor 21 can also be used as a timing cycle. The processing unit 30 is also equipped with a phase determiner 33 and a timer 31. Phase changes of the electric motor 21 are provided to the timer 31 through the phase determiner 33. The timer 31 receives a phase of driving the electric motor 21 through the phase determiner 33, and uses the phase changes as a timing reference point of the timer 31 to measure a time of a fixed duty cycle phase generated by the phase determiner 33 to drive the electric motor 21 to rotate one revolution, that is, a time required for the phase determiner 33 to generate twelve phases. A phase change time measured by the timer 31 is sent to a memory 32, a time change of each of the phases is calculated and recorded through the memory 32, and a time change of one timing cycle is calculated. By calculating a time cycle of changes of twelve phases, it can be known whether a time for the electric motor 21 to rotate one revolution increases or decreases after being driven. When a time required for the phase changes of the electric motor 21 increases, a torque generated by the electric motor 21 increases relatively, that is, a rotational speed is reduced and an output increases. Through changes in a rotational speed, the phase determiner 33 can transmit a phase change time to the timer 31 to calculate a present operating status of the electric motor 21.

When the memory 32 calculates that the phases input by the phase determiner 33 to the electric motor 21 have a changing trend of increasing time, it means that the driving rod 23 is performing an action of increasing an output, resulting in a relative reduced rotational speed of the electric motor 21. When the timer 31 receives a time of an output phase of the phase determiner 33 and calculates that the time increases, an action change signal can be provided for the processing unit 31, it can be known that the driving rod 23 is performing an output operation. In this embodiment, the action change signal is a nail-pulling action. During operation, a time of a phase of the phase determiner 33 that drives the electric motor 21 increases. After a rotational speed of the electric motor 21 is reduced, a time of a phase of the phase determiner 33 that drives the electric motor 21 again decreases, and a change in a rotational speed of the electric motor 21 becoming faster is a nail-pulling operation. After receiving the action change signal, the processing unit 31 accumulates a number of times of the action change signal, that is, a number of times of nail-pulling operation, which is sent to the memory 32 for storage.

Figure 5:
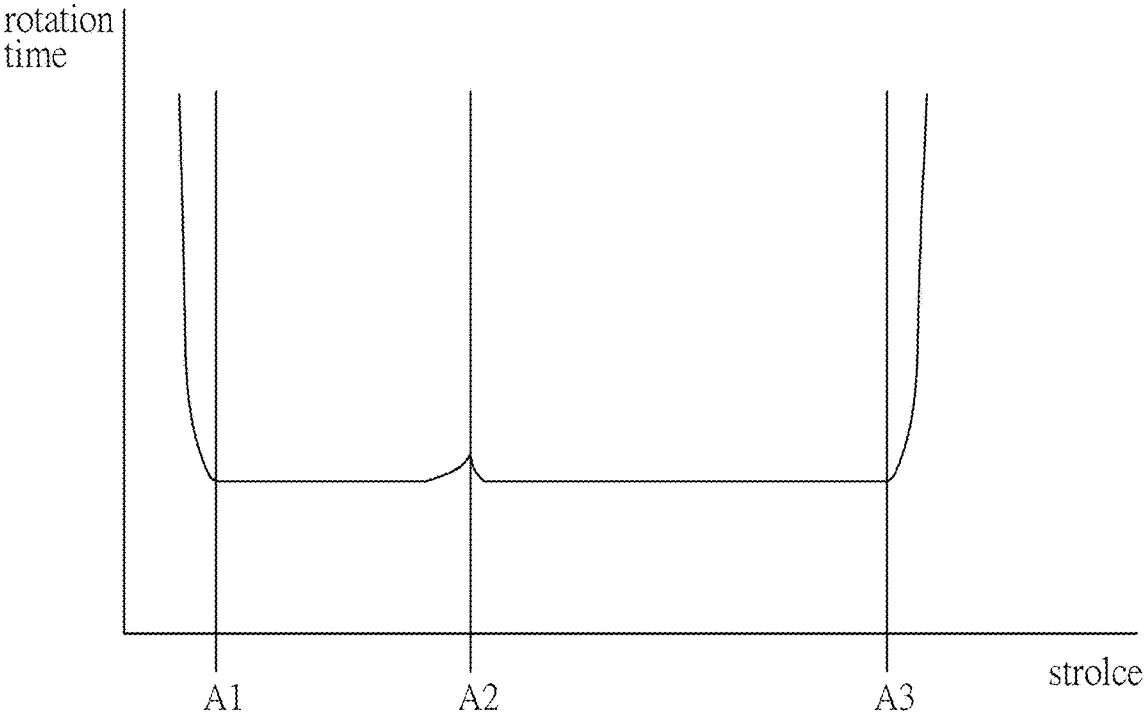
FIG. 5 is a diagram showing changes in turning speed of nail-pulling action according to the first preferred embodiment of the invention.
Figure 3:
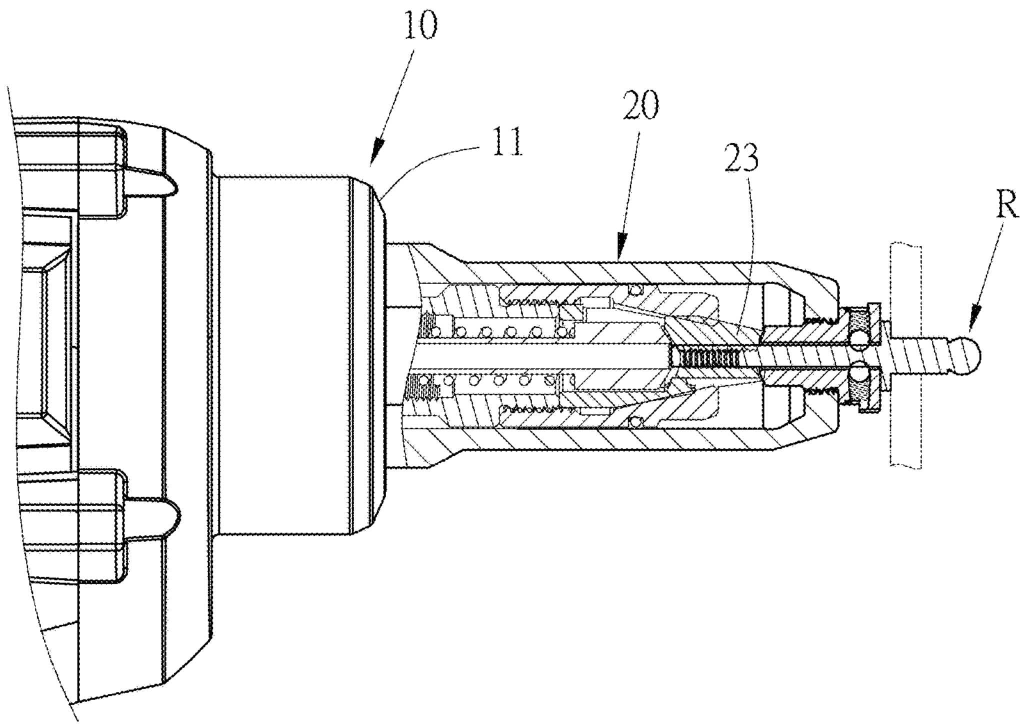
FIG. 3 is a schematic diagram of action before pulling a nail according to the first preferred embodiment of the invention.
Figure 4:
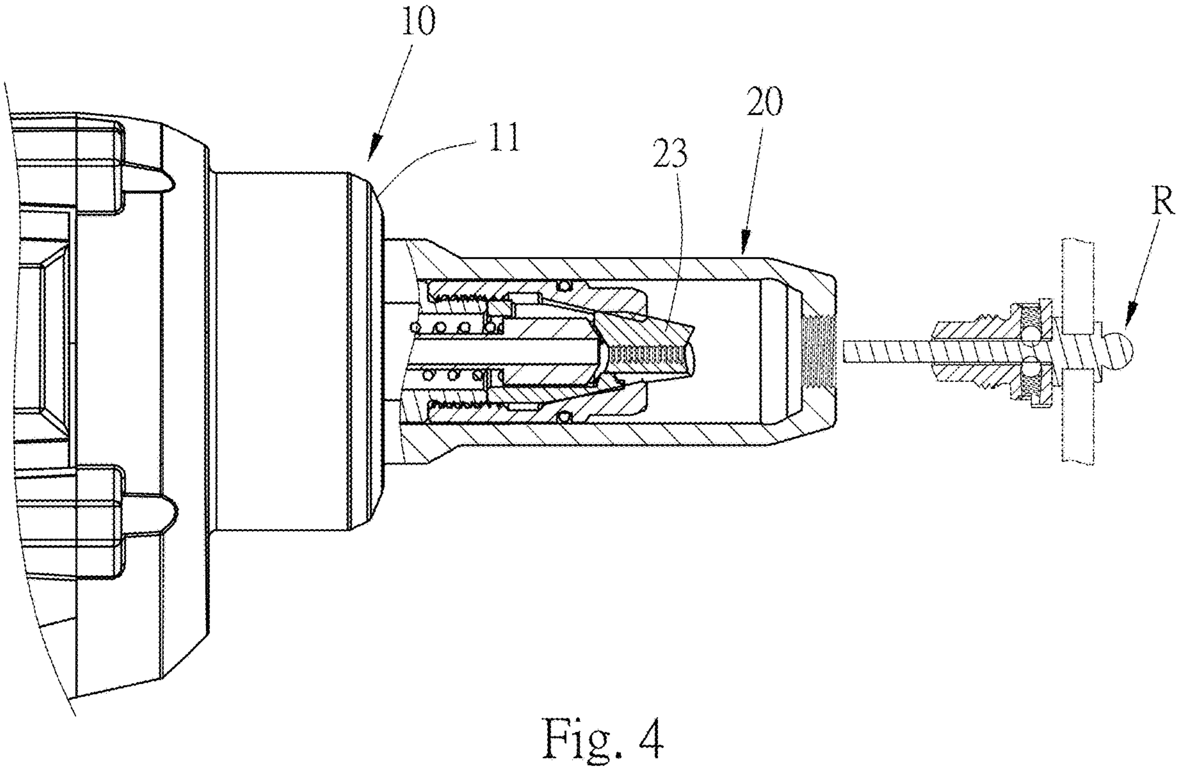
FIG. 4 is a schematic diagram of action after pulling the nail according to the first preferred embodiment of the invention.
Figure 6:
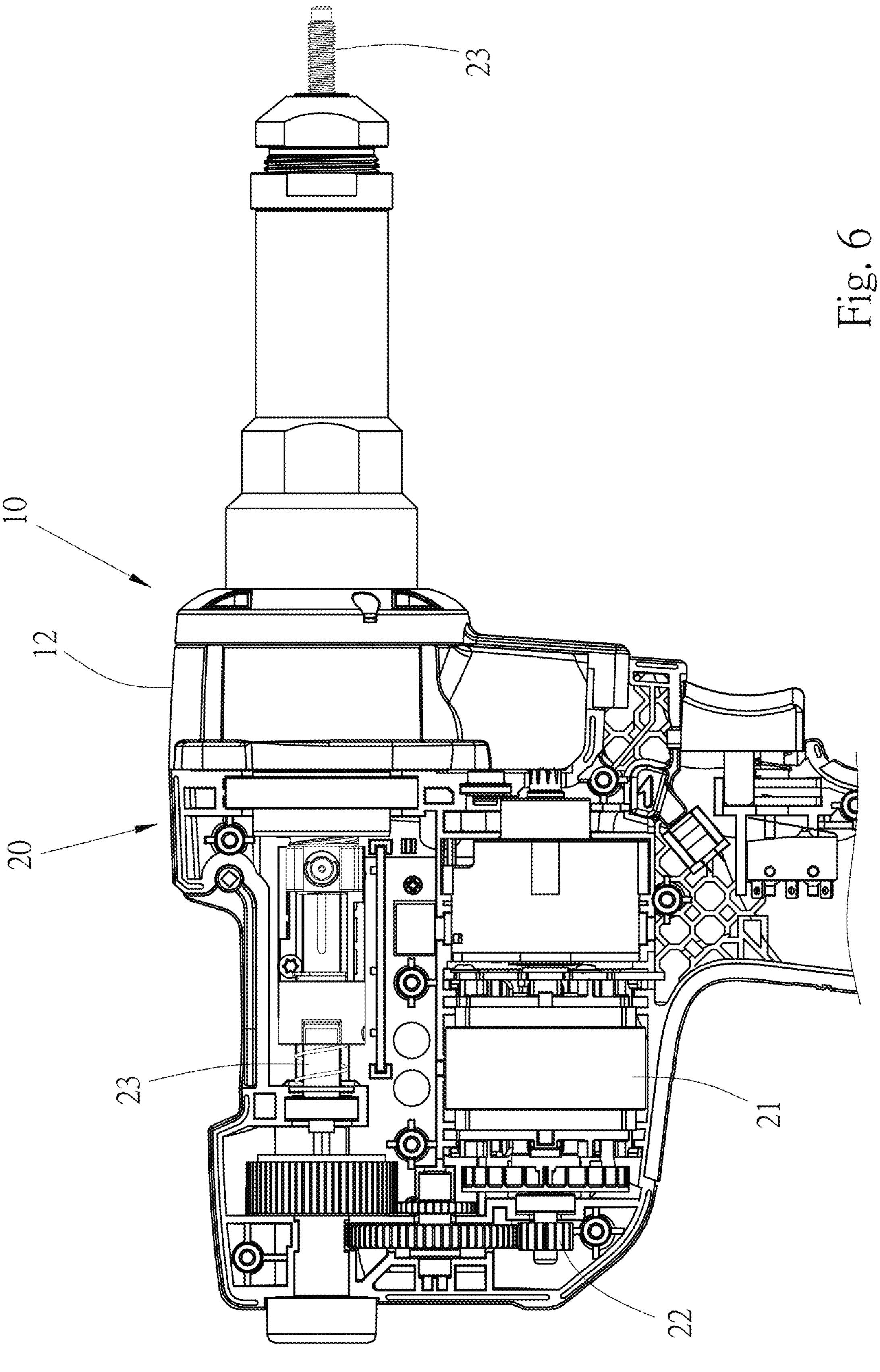
FIG. 6 is a structural diagram of a rivet nut gun according to a second preferred embodiment of the invention.
Figure 7:
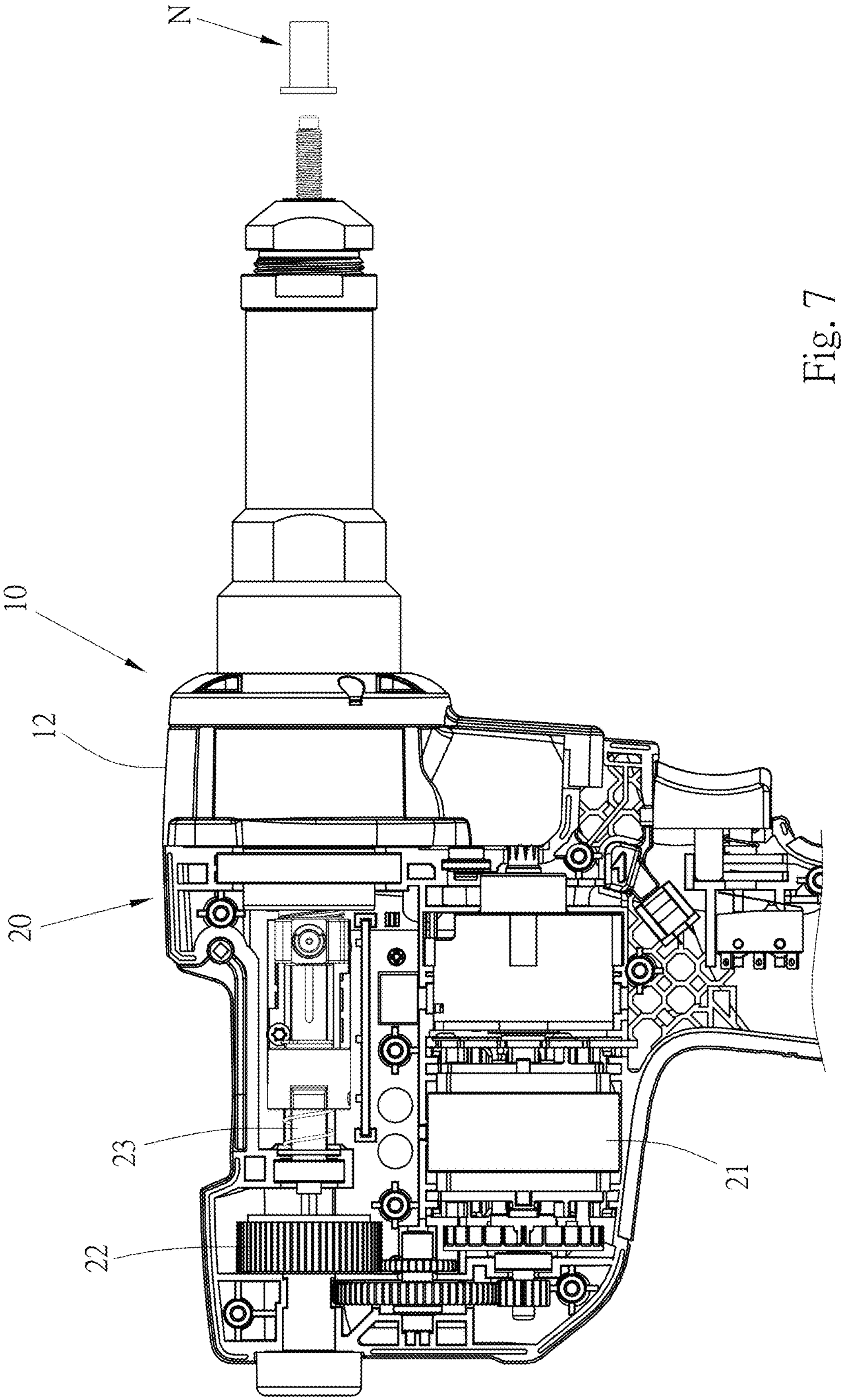
FIG. 7 is a schematic diagram of action of the rivet nut gun ready to assemble with a rivet nut according to the second preferred embodiment of the invention.
Figure 8:
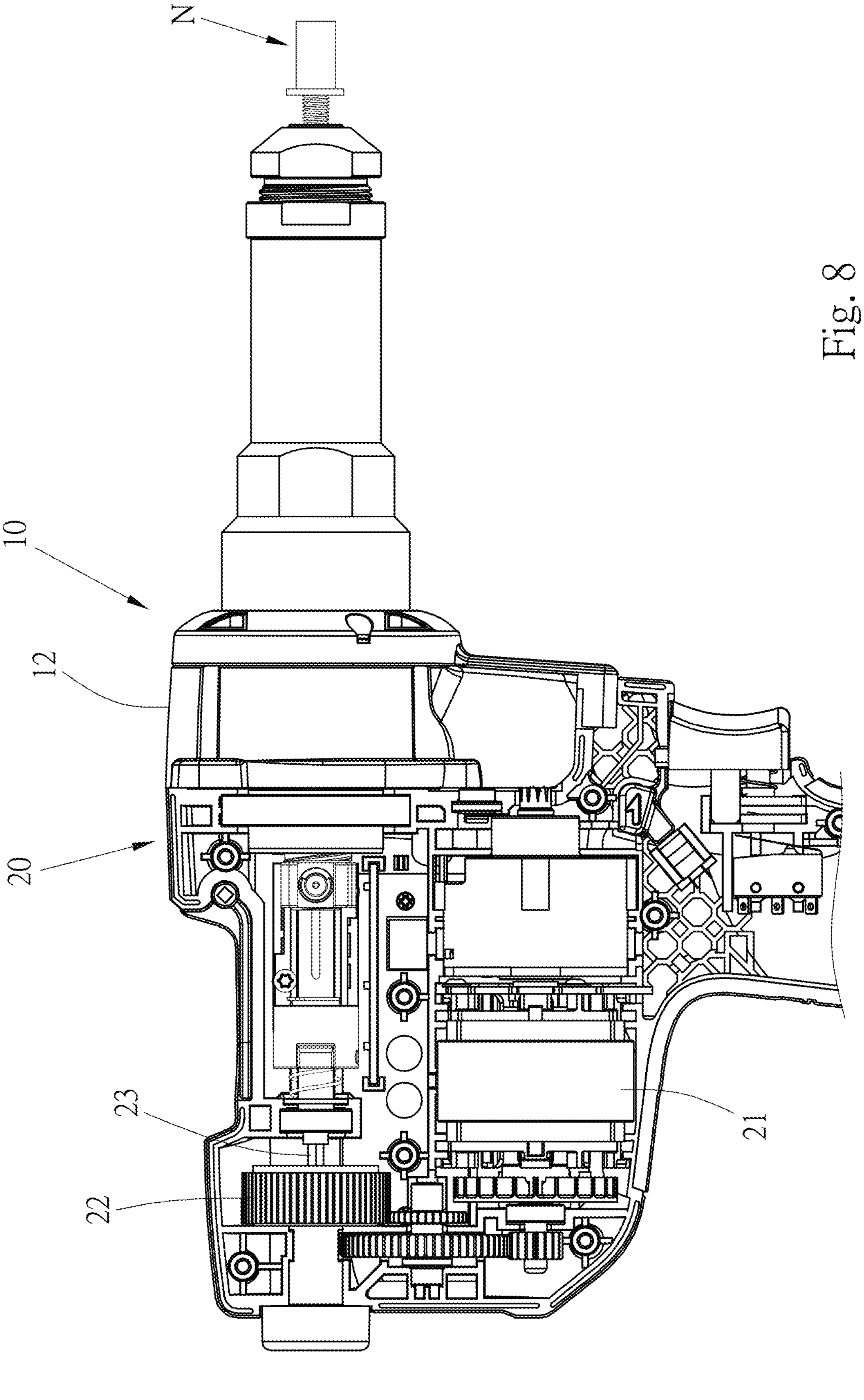
FIG. 8 is a schematic diagram of action of the rivet nut gun assembled with the rivet nut according to the second preferred embodiment of the invention.
Figure 9:
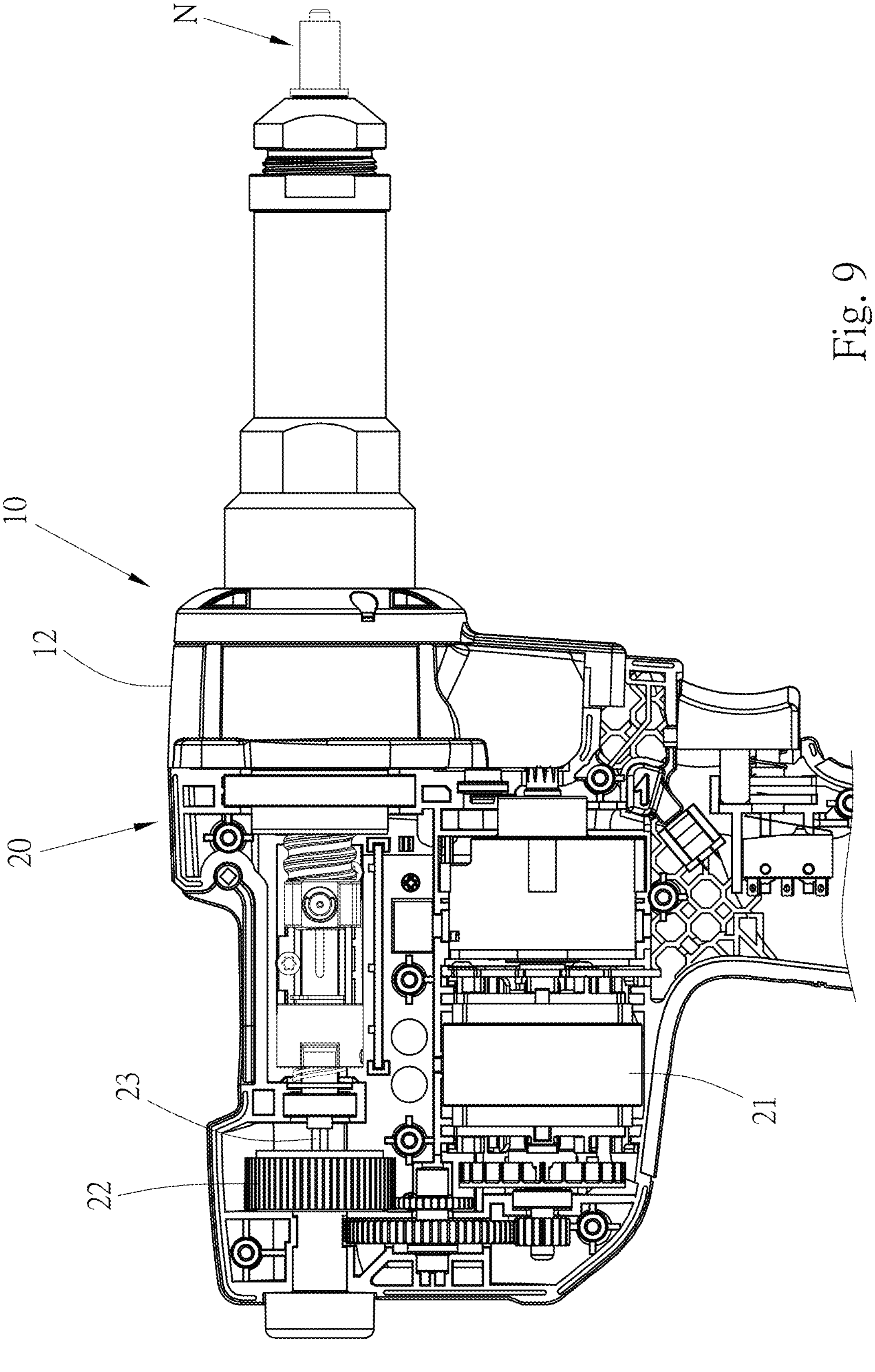
FIG. 9 is a schematic diagram of the rivet nut gun completing a rivet nut pre-lock action according to the second preferred embodiment of the invention.

Please refer to FIGS. 3 to 5. When the electric motor 21 starts to run, a time of phase changes that drive the electric motor 21 received by the phase determiner 33 gradually shortens. Shortening of a time of phase changes of the electric motor 21, a rotation time changes from long to short, which means that a rotational speed of the motor 21 gradually increases. When it reaches a lowest point of a rotation time, that is, after a time point A1 position, the electric motor 21 runs stably, and a time of phase changes that drive the electric motor 21 received by the phase determiner 33 is fixed, a rotational speed of the electric motor 21 is fixed, and a rotational speed is fixed when not in contact with a load (that is, in a status that a nail R is not pulled). When the driving rod 23 performs an action of pulling the nail R, at a time point A2 position, the driving rod 23 causes the electric motor 21 to generate an acting force after being acted upon by a force, which relatively increases a phase change time. The phase determiner 33 receives an increase in phase time of the electric motor 21 and transmits it to the timer 31, an output of the electric motor 21 increases, and a rotation time is relatively increased, that is, a rotational speed decreases. As a result, during a process of pulling the nail R, there will be a change that a rotation time increases. After nail-pulling is completed, because a load of the driving rod 23 disappears, a rotation time of the electric motor 21 will be relatively reduced and a rotational speed will be increased to an original status. In this status of reducing a rotational speed and then increasing a rotational speed, the memory 32 calculates a change that a rotational speed is reduced and then increased, an action change signal can be provided for the processing unit 30, so that the processing unit 30 can know that an action of pulling the nail R is currently performed, and add a number of times of nail-pulling to the memory 32. When the electric motor 21 stops operating at a time point A3, the processing unit 30 stops providing phases to the electric motor 21, so that a rotational speed of the electric motor 21 decreases, a time for the electric motor 21 to rotate one revolution continues to increase, and a rotational speed gradually decreases to a standstill. Thereby, a user can check a total number of times the nail gun 11 is used to pull nails after a period of use (such as a day, a week or a processing cycle).

Please refer to FIGS. 6 to 15 for a second preferred embodiment provided by the invention. The electric tool 10 is a rivet nut gun 12, and its main structure is the same as that of the previous embodiment. The same structure is represented by the same numeral, which will not be described in detail here.

The electric motor 21 of the rivet nut gun 12 can be driven by the processing unit 30 to pre-lock a rivet nut N to the driving rod 23, and the driving rod 23 performs an operation of fixing the rivet nut N. The following is a detailed description of the action change signal generated during two different operations.

Figure 10:
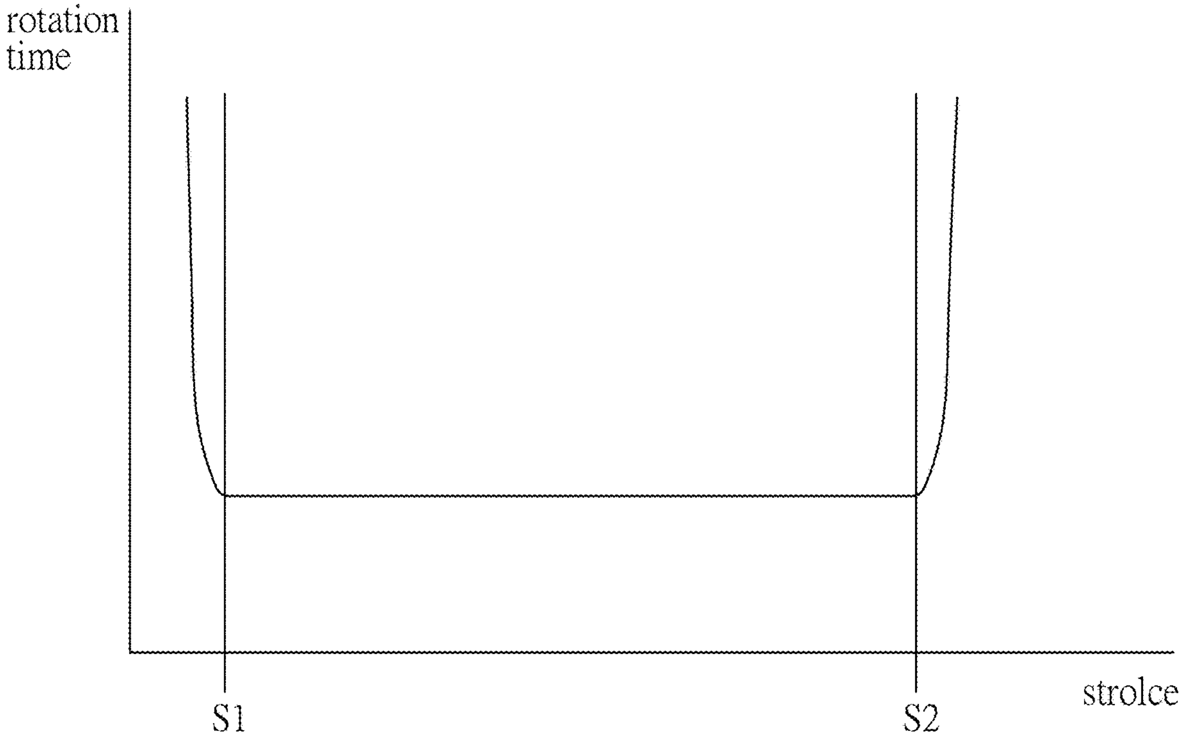
FIG. 10 is a diagram showing changes in turning speed of the rivet nut gun without pre-lock according to the second preferred embodiment of the invention.
Figure 11:
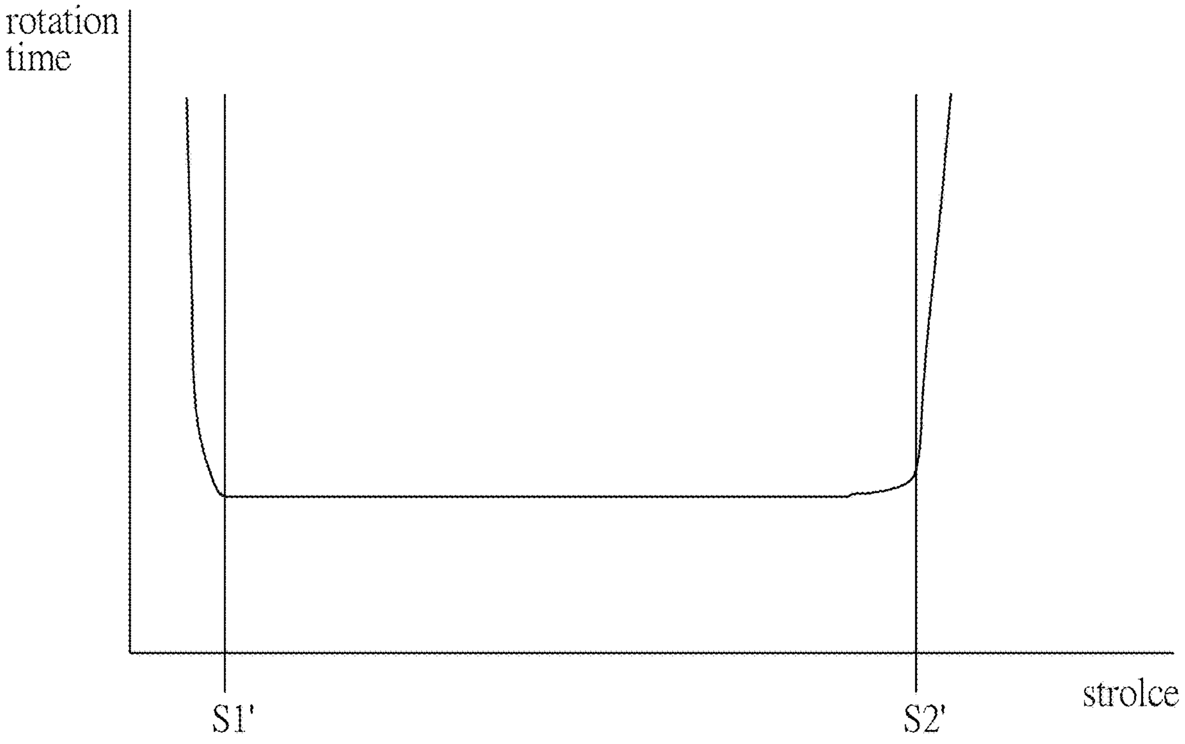
FIG. 11 is a diagram showing changes in turning speed of pre-lock of the rivet nut gun according to the second preferred embodiment of the invention.
Figure 13:
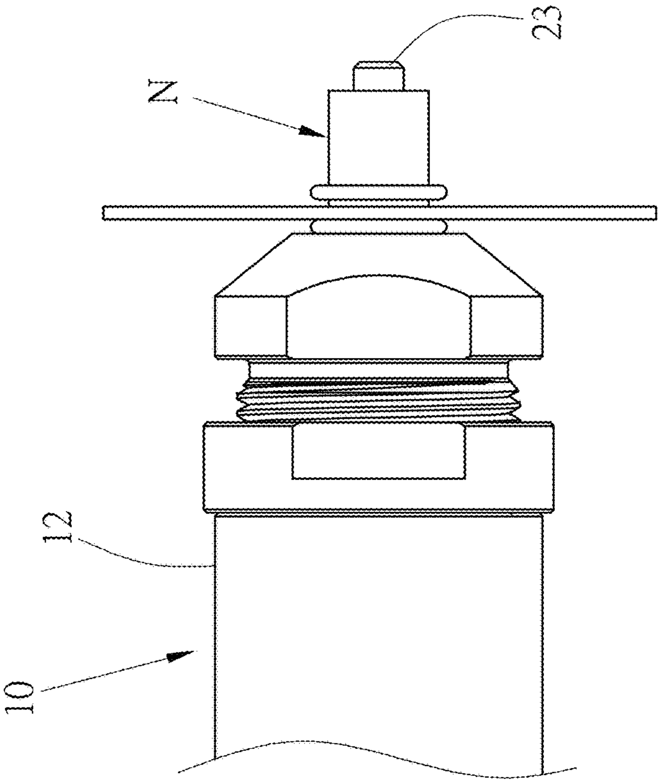
FIG. 13 is a schematic diagram of action of the rivet nut being closer of rivet nut-pulling operation according to the second preferred embodiment of the invention.
Figure 12:
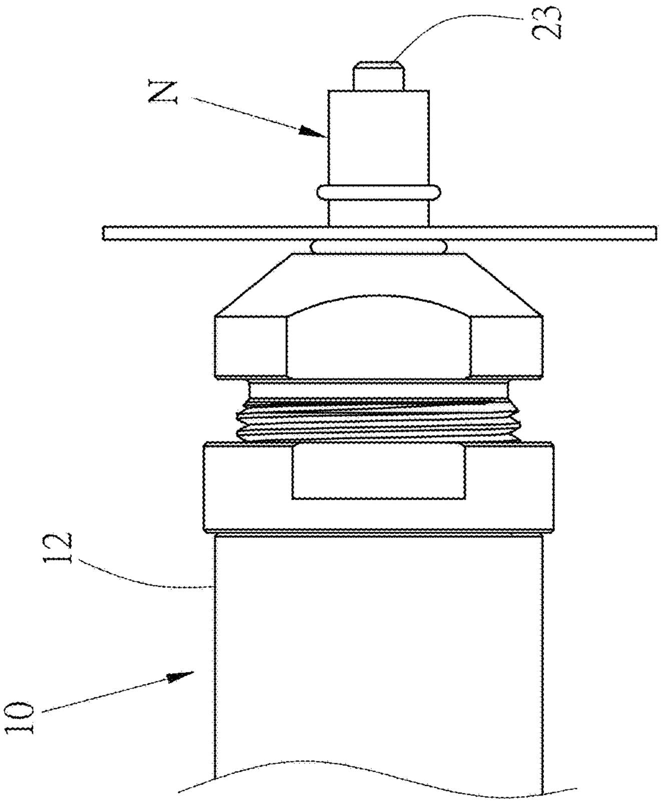
FIG. 12 is a schematic diagram of deformation action of rivet nut-pulling operation according to the second preferred embodiment of the invention.
Figure 14:
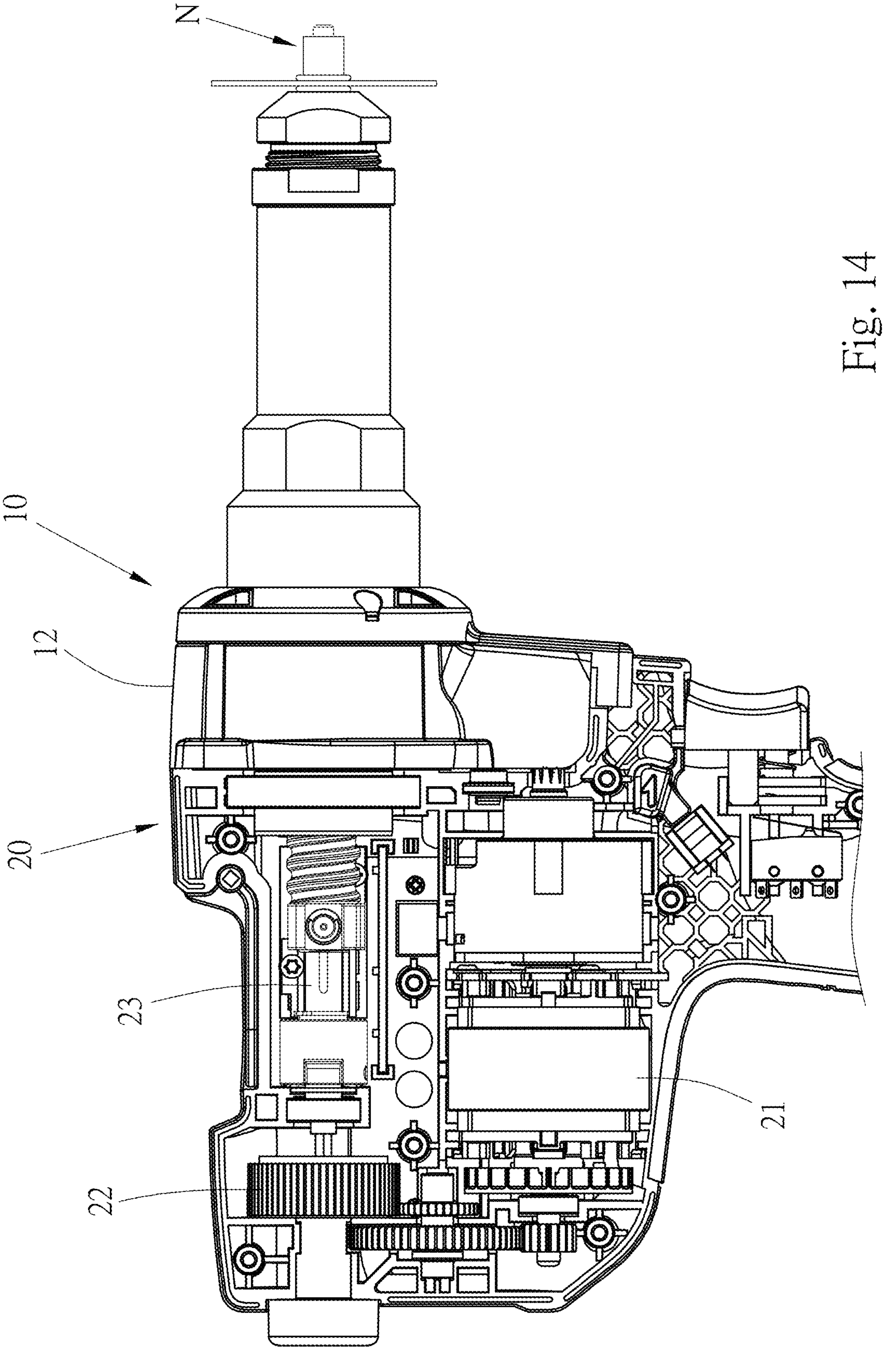
FIG. 14 is a schematic diagram of action of the rivet nut being fixed of rivet nut-pulling operation according to the second preferred embodiment of the invention.
Figure 15:
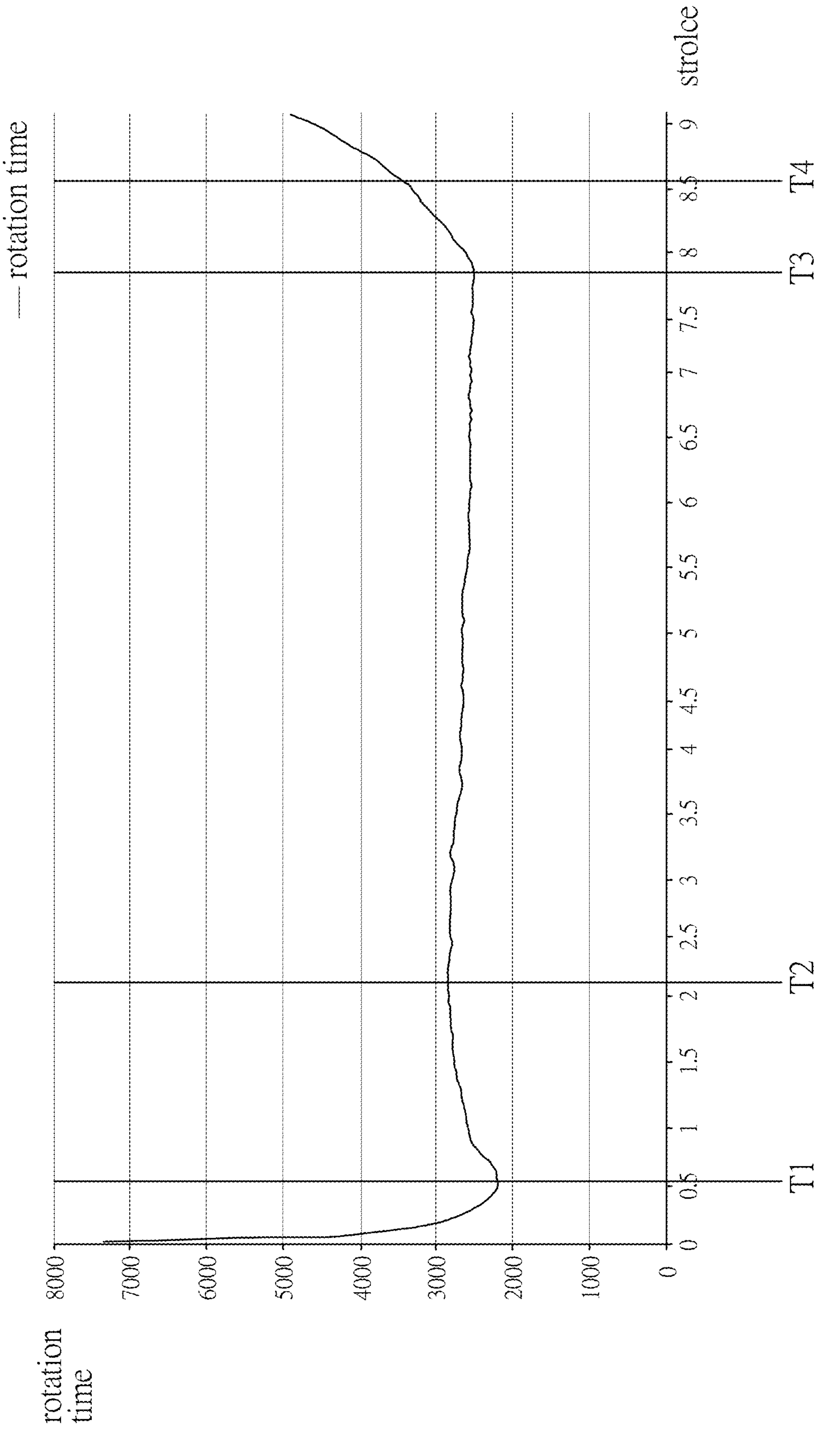
FIG. 15 is a diagram showing changes in turning speed of rivet nut-pulling of the rivet nut gun according to the second preferred embodiment of the invention.

Please refer to FIG. 10. When the rivet nut gun 12 is performing a pre-lock operation of the rivet nut N, the electric motor 21 will rotate for a fixed operating time. In a status of without disposing the rivet nut N, when operation reaches a time point S1, a rotational speed has reached a predetermined rotational speed. The phase determiner 33 receives a corresponding time of each phase change that drives electric motor 21, a rotation time will change from long to short, and will maintain for a period of time, after reaching a time point S2 position, it will stop providing phase to the electric motor 21, so that the driving rod 23 gradually stops rotating. Please refer to FIGS. 7 to 9 and FIG. 11. When the rivet nut N is installed on the driving rod 23 for pre-lock, the electric motor 21 is driven by the processing unit 30 to drive the driving rod 23 to rotate to reach a position at a time point S1', the rivet nut N is screwed into the driving rod 23 for pre-lock. After the rivet nut N completes a pre-lock action, the rivet nut N will generate a resistance to the driving rod 23, causing a rotational speed of the electric motor 21 to decrease before an originally stop time at a time point S2' set for the phase determiner 33, that is, a time for the electric motor 21 to rotate increases. The phase determiner 33 will record a phase change time and send it to the timer 31 for detection. When the memory 32 calculates from a phase change provided by the phase determiner 33 that a rotational speed of the electric motor 21 decreases before a predetermined stop time at the time point S2' during operation, the processing unit 30 is provided with an action change signal. The action change signal is defined as a pre-lock action of the rivet nut N. After the processing unit 30 receives a signal of the pre-lock action, it indicates that pre-lock of the rivet nut N has been completed. After confirming that a pre-lock operation is completed, the action change signal is transmitted to the memory 32. Provided that a pre-lock operation is completed, the rivet nut gun 12 can perform a next fixing operation of the rivet nut N. If at this stage, pre-lock operation of the rivet nut N has not been completed, a next fixing operation of the rivet nut N will not be carried out, which can avoid ineffective actions of fixing operation of the rivet nut N. When in use, the rivet nut N can also be pre-locked directly manually; alternatively, without performing pre-lock of the rivet nut N and directly performing an action of fixing of the rivet nut N, there are no restrictions on operations.

Please refer to FIGS. 12 to 15. After the pre-lock operation of the rivet nut N is completed, the rivet nut gun 12 can fix the rivet nut N. Firstly, the electric motor 21 is started to operate at a predetermined rotational speed, so that a rotation time of the electric motor 21 gradually decreases. Then, at a time point T1, a rotational speed of the electric motor 21 is reached. Please refer to FIG. 12, an action of fixing the rivet nut N is started. Between the time point T1 and a time point T2, the rivet nut N is exerted with an acting force, and the electric motor 21 exerts force to increase a torque to deform the rivet nut N. The phase determiner 33 will receive an increase in a phase change time of the electric motor 21, and will form an increase in a first rotation time of the electric motor 21, that is, a rotational speed decreases, a rotational speed of the electric motor 21 slows down and capable of exerting an acting force on the driving rod 23, so that the driving rod 23 is capable of exerting force on the rivet nut N to form deformation. Then, please refer to FIG. 13, between the time point T2 and a time point T3, the rivet nut N is gradually deformed. When the rivet nut N is convex and flattened and deformed, the electric motor 21 maintains a certain load, so a phase change time of the electric motor 21 will be maintained in a fixed time interval, a rotation time of the electric motor 21 will be maintained in a fixed rotational speed interval without much change, and the rivet nut N will gradually deform and move closer. Please refer to FIG. 14. When a position at the time point T3 is reached, the deformed rivet nut N will gradually be pulled toward two sides of a metal sheet for clamping and coupling. A load force of the driving rod 23 increases, and the phase determiner 33 receives a gradually increase in a phase change time of the electric motor 21, so a rotation time generated by the electric motor 21 will gradually increase, that is, a rotational speed will gradually decrease in order to generate a greater torque. At this time, the memory 32 generates a second action change signal after provided with a phase change time by the phase determiner 33. After the memory 32 receives a phase change time of the timer 31, the memory 32 calculates that a phase time increases to a set value, that is, a rotation time of the electric motor 21 decreases to reach a set value of stopping rotational speed, the processing unit 30 will stop operation of the electric motor 21 and complete a fixing action of the rivet nut N. Thereby preventing the electric motor 21 from continuously exerting force on the driving rod 23, resulting in excessive coupling to damage the rivet nut N or the metal sheet.

In the electric tool capable of determining an operating status through a rotational speed provided by the invention, the electric motor will have different rotational speed changes in different statuses. By calculating a phase time of the phase determiner in the memory to calculate a rotational speed of the electric motor, a present operating status can be known, ensuring reliable operation of actions, and the processing unit can be used to perform subsequent corresponding processing, such as counting or stopping operations.

Although the invention has been disclosed as above with the embodiments, it is not intended to limit the invention. A person having ordinary skill in the art to which the invention pertains can make various changes and modifications without departing from the spirit and scope of the invention. Therefore, scope of protection of the invention shall be subject to what is defined in the pending claims.

What is claimed is:

1. An electric tool capable of determining an operating status through a rotational speed, comprising:

a body;

an electric motor disposed in the body and capable of rotating by being driven through phase changes;

a driving rod disposed in the body and capable of performing an operation to deform a workpiece by being driven by the electric motor;

a processing unit disposed in the body and electrically connected to the electric motor, the processing unit being capable of providing phases for driving the electric motor by being operated;

the processing unit being provided with a timer capable of receiving a time of phase changes of the electric motor and measuring a time of the phase changes of the electric motor to rotate at a predetermined angle; and a memory capable of recording and calculating a time of the phase changes;

when the processing unit detecting an increasing change in a time of the phase changes, that being, when a rotational speed of the electric motor slowing down, an action change signal being generated, and an operating status of the driving rod being determined through the action change signal.

2. The electric tool as claimed in claim 1, wherein the electric tool is a nail gun, and the action change signal is that during operation, an increase in time of the phase changes of the electric motor, after a rotational speed of the electric motor slows down, a time it takes to drive the electric motor through the phase changes is reduced, and a change in a rotational speed of the electric motor becoming faster is defined as a nail-pulling operation.

3. The electric tool as claimed in claim 2, wherein the electric tool is a nail gun, the memory is capable of calculating a number of times of the action change signal and using it as a statistics of a number of times of nail-pulling operation.

4. The electric tool as claimed in claim 1, wherein the electric tool is a rivet nut gun, the action change signal is that during operation, a time of the phase changes that drive the electric motor is increased earlier, so that a rotational speed of the electric motor slows down earlier, and the action change signal is defined as a pre-lock operation.

5. The electric tool as claimed in claim 4, wherein after the pre-lock operation is completed, the action change signal is stored in the memory, provided that when the memory is stored with the action change signal during the pre-lock operation, the processing unit can perform a rivet nut-pulling operation; the action change signal of the rivet nut-pulling operation has a first action change signal and a second action change signal; the first action change signal is that a time of the phase changes that drive the electric motor is maintained after increasing, a rotational speed of the electric motor being slowed down and then maintained is defined as an operation of deformed rivet nut, the second action change signal is that a time of the phase changes that drive the electric motor continues to increase, a rotational speed of the electric motor continuing to slow down until stopping is defined as an operation of pressurized rivet nut.

6. The electric tool as claimed in claim 5, wherein in the second action change signal of the rivet nut-pulling operation, when a phase change time of the electric motor increases to a time value, that is, a rotational speed of the electric motor is lower than a set value of stopping rotational speed, the processing unit stops the electric motor from running.

7. The electric tool as claimed in claim 1, wherein the electric tool is a rivet nut gun, and the action change signal is defined as a rivet nut-pulling operation; the action change signal of the rivet nut-pulling operation has a first action change signal and a second action change signal; the first action change signal is that a time of the phase changes that drive the electric motor is maintained after increasing, a rotational speed of the electric motor being slowed down and then maintained is defined as an operation of deformed rivet nut, the second action change signal is that a time of the phase changes that drive the electric motor continues to increase, a rotational speed of the electric motor continuing to slow down until stopping is defined as an operation of pressurized rivet nut.

8. The electric tool as claimed in claim 7, wherein in the second action change signal of the rivet nut-pulling operation, when a phase change time of the electric motor increases to a time value, that is, a rotational speed of the electric motor is lower than a set value of stopping rotational speed, the processing unit stops the electric motor from running.

9. The electric tool as claimed in claim 1, wherein the timer measures a time required for the phase changes of the electric motor rotating one revolution as a calculating time.

10. The electric tool as claimed in claim 9, wherein the electric motor is a four-pole six-phase brushless DC motor, which requires twelve phases to rotate one revolution.

11. The electric tool as claimed in claim 1, wherein the electric motor is a four-pole six-phase brushless DC motor, which requires twelve phases to rotate one revolution.

12. The electric tool as claimed in claim 10, wherein the processing unit further comprises a phase determiner, the phase determiner is electrically connected to the electric motor, the timer and the processing unit, and the phase determiner is capable of receiving the phase changes of the electric motor and transmitting the phase changes to the timer.

13. The electric tool as claimed in claim 11, wherein the processing unit further comprises a phase determiner, the phase determiner is electrically connected to the electric motor, the timer and the processing unit, and the phase determiner is capable of receiving the phase changes of the electric motor and transmitting the phase changes to the timer.

14. The electric tool as claimed in claim 1, wherein a pulse wave change that drives the electric motor is a fixed duty cycle.

* * * * *